US008645864B1

(12) United States Patent
Wright (10) Patent No.: US 8,645,864 B1
(45) Date of Patent: Feb. 4, 2014

(54) MULTIDIMENSIONAL DATA INPUT INTERFACE

(75) Inventor: David A. Wright, San Francisco, CA (US)

(73) Assignee: Nvidia Corporation, Santa Clara, CA (US)

(*) Notice: Subject to any disclaimer, the term of this patent is extended or adjusted under 35 U.S.C. 154(b) by 879 days.

(21) Appl. No.: 11/934,956

(22) Filed: Nov. 5, 2007

(51) Int. Cl.
*G06F 3/048* (2013.01)

(52) U.S. Cl.
USPC .......................................... 715/821; 715/860

(58) Field of Classification Search
USPC ........... 715/764, 821, 860; 707/706, 707, 708
See application file for complete search history.

(56) References Cited

U.S. PATENT DOCUMENTS

| 5,212,733 | A | * | 5/1993 | DeVitt et al. | 381/119 |
| 5,740,390 | A | * | 4/1998 | Pickover et al. | 715/835 |
| 5,757,358 | A | * | 5/1998 | Osga | 715/862 |
| 5,890,152 | A | * | 3/1999 | Rapaport et al. | 1/1 |
| 6,154,213 | A | * | 11/2000 | Rennison et al. | 715/854 |
| 7,844,914 | B2 | * | 11/2010 | Andre et al. | 715/773 |
| 2004/0183833 | A1 | * | 9/2004 | Chua | 345/773 |
| 2007/0288498 | A1 | * | 12/2007 | Dietz et al. | 707/102 |
| 2008/0120291 | A1 | * | 5/2008 | Delgo et al. | 707/5 |

* cited by examiner

*Primary Examiner* — Omar Abdul-Ali
(74) *Attorney, Agent, or Firm* — Patterson + Sheridan, L.L.P.

(57) ABSTRACT

Embodiments of the invention provide an interface for simultaneously inputting multiple data parameters for a software application. Generally, a single user input made using the input interface results in multiple data parameters being received by the application. In one embodiment, the input interface may be defined with a plurality of dimensional nodes, where each dimensional node corresponds to a dimension of input that may be specified for the software application using the input interface.

18 Claims, 6 Drawing Sheets

MULTIDIMENSIONAL DATA INPUT INTERFACE

BACKGROUND OF THE INVENTION

1. Field of the Invention

The present invention generally relates to computer user interfaces. More specifically, the present invention relates to techniques for providing a multidimensional data input interface.

2. Description of the Related Art

Generally, computer software applications provide interfaces which enable users to interact with the application. In some situations, an interface may be configured to receive user inputs for data parameters required to execute the application. The data parameters may include non-persistent values used as inputs for a particular occasion of use of the application. For example, a database search tool may require inputs assigning weights to different search criteria. In other cases, the data parameters may include persistent values used for configuring the application (i.e., application settings). For example, a photo printing application may be configurable by user input of a print darkness setting, which may be set to values such as "light," "dark," and "medium."

Typically, software applications provide user interfaces that include multiple data entry elements configured to receive various data parameters. For example, such data entry elements may include text entry boxes, buttons, sliders, menus, and the like. In some situations, a user may have to interact with several data entry elements to input multiple data parameters required to run the application. Further, if the data parameters subsequently require adjustment, the user may have to perform additional interactions with the data entry elements. Such repeated interactions with multiple data entry elements can be tedious and inefficient. Further, if the data parameters are conceptually related. That is, the settings for one parameter may often constrain what settings may be specified for another, related parameter. In such cases, the user may find interacting with diverse data entry elements to be counter-intuitive.

Accordingly, as the foregoing discussion demonstrates, there is a need in the art for improved techniques for the input of multiple data parameters.

SUMMARY OF THE INVENTION

Embodiments of the invention provide a multidimensional interface configured for the input of multiple data parameters. A method for providing multidimensional data input to a computer program may include receiving a user selection of a location within a graphical interface. The graphical interface includes one or more dimensional nodes, where each dimensional node corresponds to one or more input parameters to be provided to the computer program. The method also includes determining a coordinate location of the user selection relative to the one or more dimensional nodes. Values for each of the one or more input parameters of the computer program may be determined based on the determined coordinates.

Advantageously, the multidimensional interface may enable a user to enter multiple data parameters for use in the computer program with a single input, thus allowing entry of multiple data parameters to be performed rapidly and intuitively.

DETAILED DESCRIPTION OF THE PREFERRED EMBODIMENTS

Embodiments of the invention provide an interface for simultaneously inputting multiple data parameters for a software application. Generally, a single user input made using the input interface results in multiple data parameters being received by the application. In one embodiment, the input interface may be defined with a plurality of dimensional nodes, where each dimensional node corresponds to a dimension of input that may be specified for the software application using the input interface. Further, two (or more) dimensional nodes may be related to one another, such that a data parameter specified for one node constrains a data parameter for another dimensional node. However, dimensional nodes may also be generally unrelated to one another.

Figure 1:
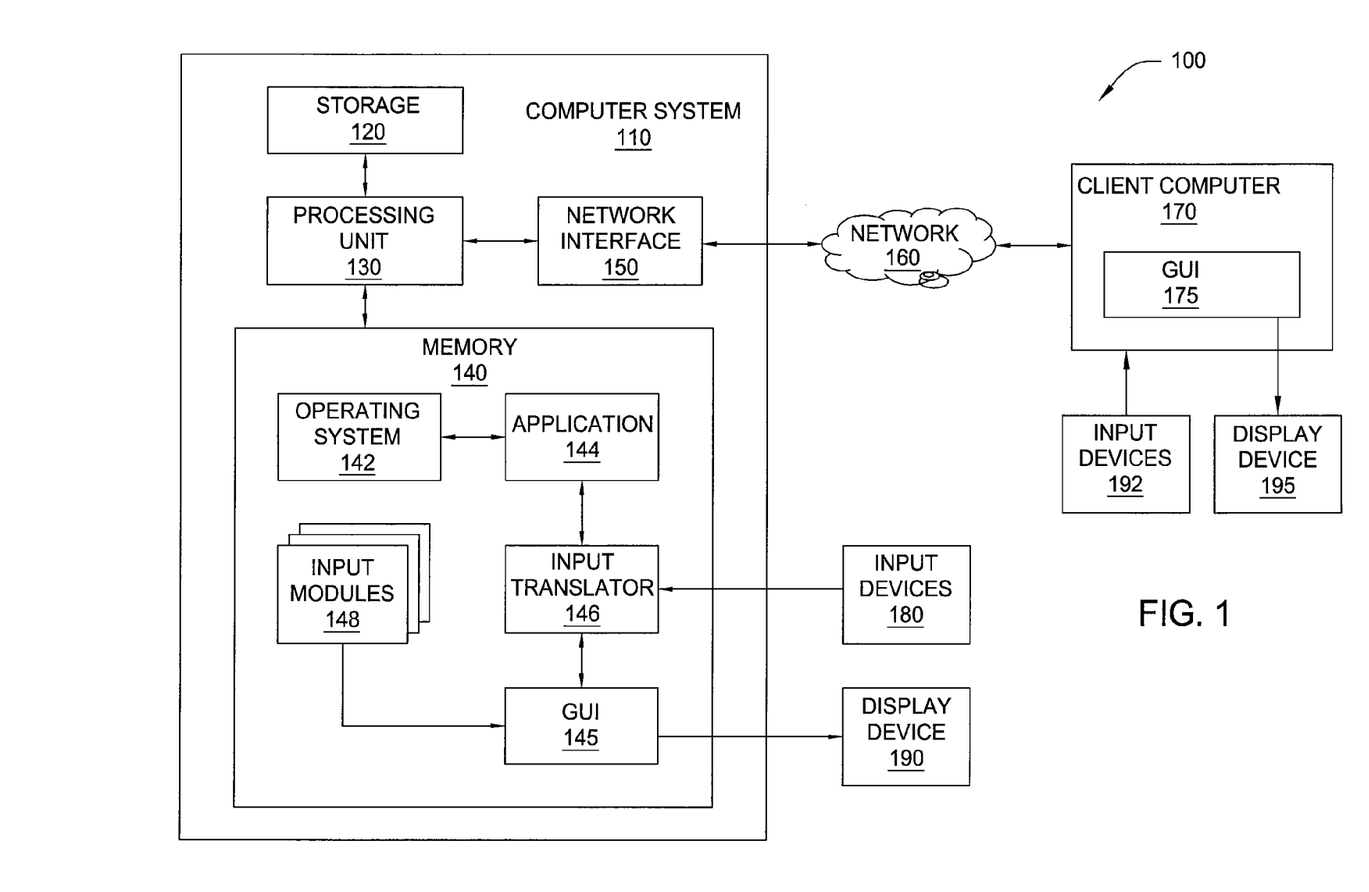
FIG. 1 is a block diagram illustrating a computing environment configured to provide a multidimensional input interface, according to one embodiment of the invention.

FIG. 1 is a block diagram illustrating a computing environment 100 configured to provide a multidimensional input interface, according to one embodiment of the invention. The components illustrated in computing environment 100 are included to be representative of computer software applications executing on existing computer systems, e.g., desktop computers, server computers, laptop computers, tablet computers, and the like. Of course, the software applications described herein are not limited to any particular computing system and may be adapted to take advantage of new computing systems as they become available.

Additionally, the components illustrated in computing environment 100 may be implemented as software applications that execute on a single computer system or on distributed systems communicating over computer networks such as local area networks or large, wide area networks, such as the Internet. For example, computing environment 100 may include a graphical user interface (GUI) 145 executing on a computer system 110 hosting an application 144. Additionally, computing environment 100 may include a GUI 175 executing on a client computer 170 at one physical location and communicating with application 144 hosted on computer system 110 at another physical location. Of course, application 144 and GUI 145 may be integrated as a single software application. Also, application 144 and GUI 145 may be provided as an application program (or programs) stored on computer readable media such as a CD-ROM, DVD-ROM, flash memory module, or other tangible storage media.

As shown, computing environment 100 includes computer system 110, client computer 170, a network 160, input devices 180, and display device 190. Computer system 110 includes storage 120, a processing unit 130, a memory 140, and a network interface 150. Processing unit 130 is a programmable logic device that performs the instructions, logic, and mathematical processing within a computer. Storage 120 stores application programs and data for use by computer system 110. Examples of storage 120 include hard-disk drives, flash memory devices, optical media and the like. Network interface 150 enables computer system 110 to connect to network 160, which generally represents any kind of data communications network. Accordingly, network 160 may represent both local and wide area networks, including the Internet. Input devices 180 may include a mouse, a keyboard, a digitizing tablet, and the like. Display devices 190 may include CRT screens, LCD displays, plasma displays, or other display technologies. In one embodiment, input device 180 may be incorporated into display device 190, for example, in a touch-sensitive screen.

As shown, memory 140 includes an operating system 142, application 144, GUI 145, an input translator 146, and one or more input modules 148. Application 144 represents a software application configured to receive user input from multidimensional input interface. For example, application 144 may provide a search tool where the multidimensional input interface is used to specify how to weight different search criteria.

In one embodiment, GUI 145 provides a multidimensional input interface. More specifically, GUI 145 provides a graphical interface configured to receive user-input for use in application 144. The user-input may be translated to a parameter value for each dimension present on the multidimensional input interface. Users may view GUI 145 on display device 190, and may interact with GUI 145 using input devices 180. GUI 145 may be configured according to input modules 148, which define data parameters (i.e., the dimensions) included in the multidimensional input interface of GUI 145. Input modules 148 may be configured to represent a specific data parameter, e.g., "annual income." Alternatively, an input module 148 may be configured to represent a group of descriptive parameters, which may be defined within the input module itself. For example, a "positive words" input module 148 may include a dictionary of positive words, such as "good," "great," "fantastic," etc.

Input modules 148 may also include fuzzy logic, meaning that precise definitions are not required. For example, an input module 148 including fuzzy logic may translate user input to the multidimensional input interface based on imprecise terms such as "spicy" and "mild." In such a case, the multidimensional input interface could be used to specify a desired search criteria for recipes determined to be (or have) more (or less) of the imprecise property specified in the input module 148. In this example, recipes that are more (or less) spicy, based on the user input to the multidimensional input interface. Further, by adding additional input modules 149 to the multidimensional input interface, desired proprieties may specified at the same time. Continuing with the recipe search example, another dimension of the multidimensional input interface could relate to the preparation time for a given recipe (e.g., from "short" to "long"). In such a case, the multidimensional input interface may be used to specify criteria for both input modules 148 simultaneously.

Similarly, GUI 175 running on client computer 170 may provide a multidimensional input interface. Users may view GUI 175 on display device 195, and may interact with GUI 175 using input devices 182. In such a case, data input to GUI 175 using one of input devices 182 may be transmitted to computer system 110 over network 160.

In one embodiment, input modules 148 can be selectively activated or deactivated to add or remove data parameters from the GUI 145. Each input module 148 selected for the multidimensional input interface may be visually represented on GUI 145 as a node. The nodes included in GUI 145 may be linked by lines so as to define an enclosed region on GUI 145 for receiving user input, e.g., by clicking a mouse or touching a touch-screen within the enclosed region. The specific location of the input within the area defined by the nodes is used to determine values for each dimensional node of the multidimensional input interface.

Figure 2A:
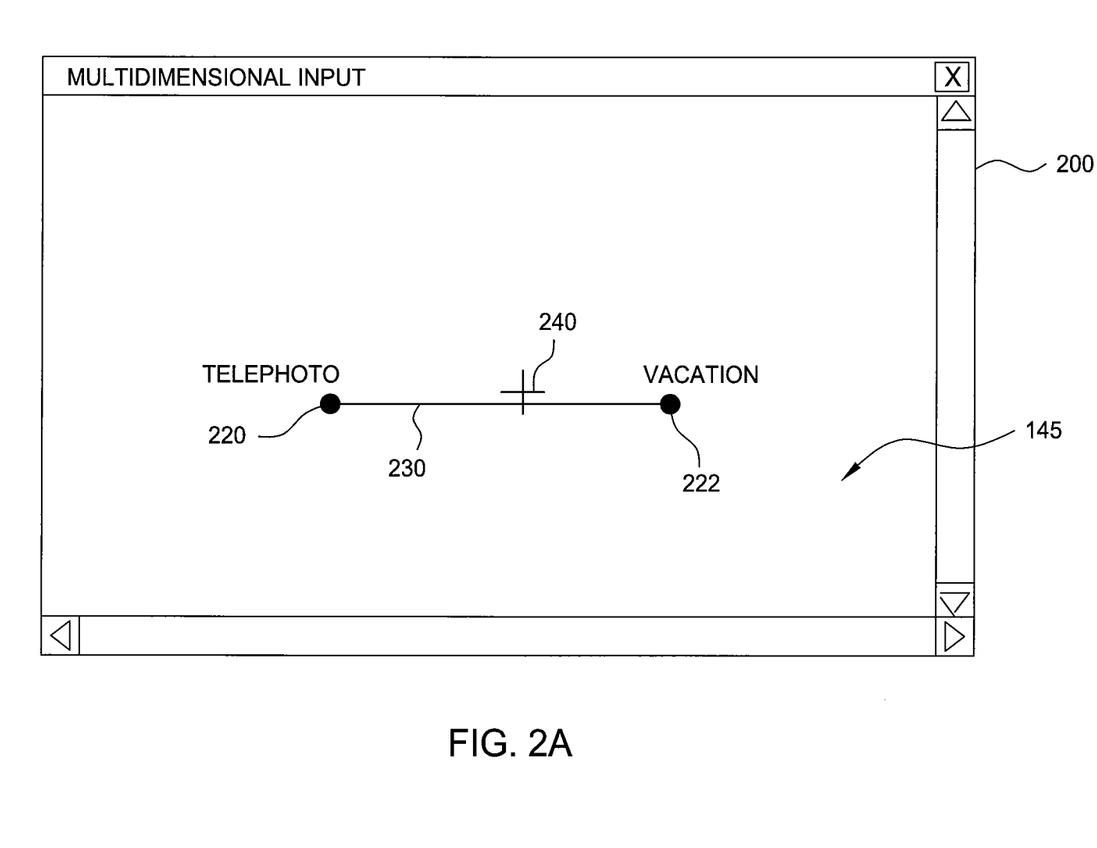
FIGS. 2A-2B illustrate a screen display of a graphical user interface providing a multidimensional input interface, according to one embodiment of the invention.

By way of example, FIG. 2A illustrates a screen display 200 of GUI 145 providing a multidimensional input interface, according to one embodiment of the invention. In this example, GUI 145 is configured to receive user input specifying criteria for searching a database of photographs. Assume also that the database includes metadata tags describing each photograph. As shown in FIG. 2A, GUI 145 includes a "TELEPHOTO" node 220 and a "VACATION" node 222, representing two parameters used for searching the photography database. More specifically, nodes 220 and 222 represent search criteria to be matched against metadata tags of the photographs.

As shown, a line 230 joins nodes 220 and 222. Line 230 generally represents the area in which the user input may be received. The user input is illustrated by a cursor 240. In one embodiment, the distance of the user input to nodes 220 and 222 represents the relative importance assigned by the user to the "TELEPHOTO" and "VACATION" search criteria. That is, if the user input on line 230 is located some proportion closer to the "VACATION" node 222 than to the "TELEPHOTO" node 220, the user is indicating a proportional preference for photographs having a "VACATION" tag over photographs having a "TELEPHOTO" tag. Note that line 230 represents two "dimensions," namely the importance of the "TELEPHOTO" and "VACATION" search criteria.

Referring again to FIG. 1, the user input within GUI 145 may be received by input translator 146. In one embodiment, input translator 146 is configured to convert a user input to one or more parameter values. More specifically, input translator 146 evaluates the position of the user input received in GUI 145 in terms of the dimension(s) defined by the nodes representing input modules 148. For example, in FIG. 2A, the location of the user input is evaluated in terms of the dimensions represented by line 230 and bounded by nodes 220 and 222. The position along the defined dimension(s) is converted to parameter values used by application 144.

Figure 2B:
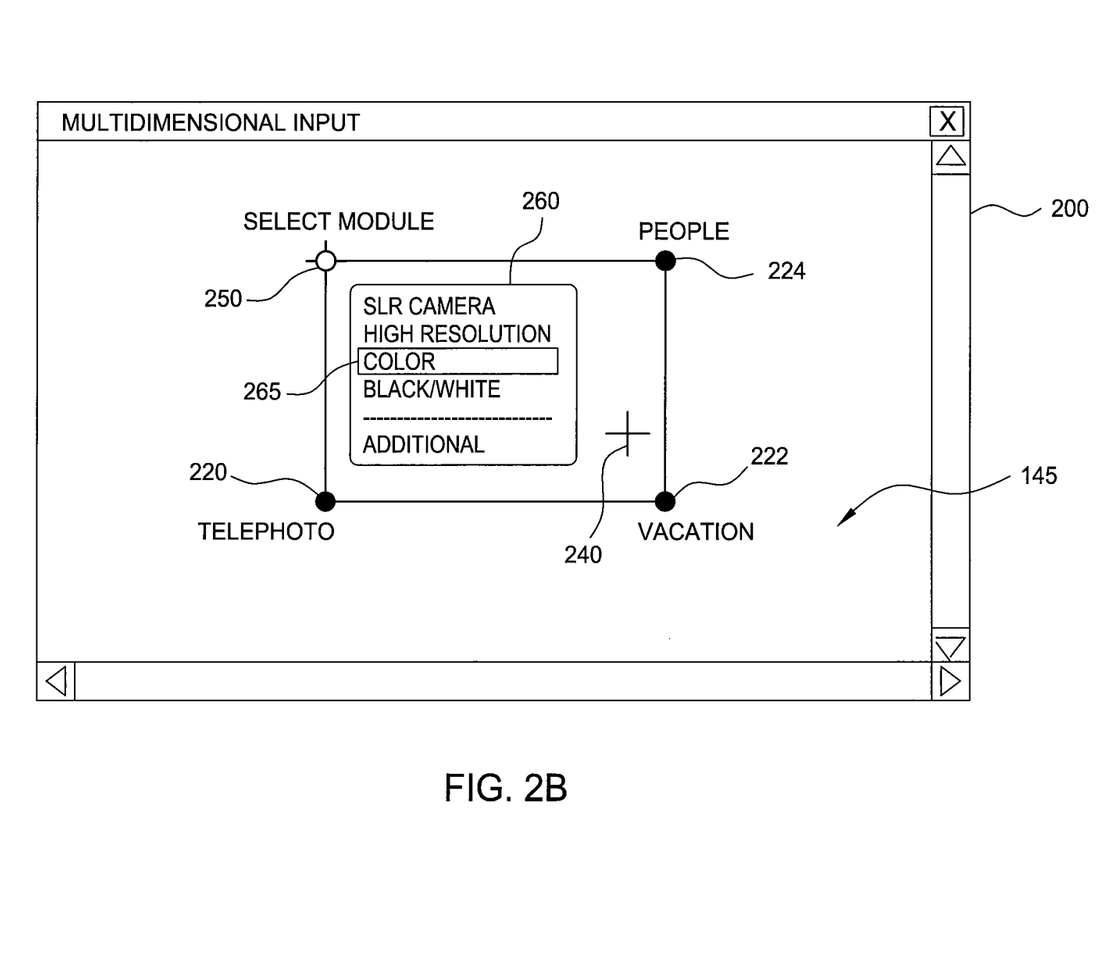

As described, a user may modify GUI 145 by adding or removing nodes representing input modules 148. By way of example, FIG. 2B illustrates screen display 200 of GUI 145 in the situation that a user wishes to add more parameters for searching the photography database. As shown, FIG. 2B differs from FIG. 2A in that the user has added a third node 224, labeled "PEOPLE," and is in the process of adding a fourth node 250, labeled "SELECT MODULE". In one embodiment, the user may select a location within GUI 145 to add a new node, and may then select an input module 148 to specify the data parameter represented by the new node. In this example, the user has specified a location for new node 250, resulting in the display of a pop-up menu 260. As shown, the user has selected a "COLOR" module 265 from pop-up menu 260, indicating the name of the input module 148 to be represented by node 250. Note, however, users may add (or remove) nodes to GUI 145 as desired. Thus, GUI 145 may be configured to include any parameters and/or geometry of nodes that may be advantageous for given applications.

In one embodiment, the nodes included in GUI 145 may be "locked" by a user, indicating that the parameter represented by the locked node is not evaluated by coordinates of a user input. That is, the parameter represented by a locked node may receive the highest available input value, regardless of the position of the user input. The coordinates of the user input may then be evaluated solely on the basis of the remaining (non-locked) nodes. Thus, the data parameters received by the application may be a combination of a maximum value for a locked node, and of values derived from coordinates of the remaining nodes. For example, if "VACATION" node 222 shown in FIG. 2B is locked by a user, searches within the photography database may be performed such each photograph included in the search results includes a metadata tag of "VACATION," as well as some relative proportion of the remaining metadata tags. Of course, alternatively, a locked node may represent a lowest possible input value. For example, locking the "VACATION" node 222 may result in database searches for photographs that do not include the "VACATION" metadata tag. A locked node may be displayed in GUI 145 as having a visual indicator (not shown) that the node is locked. For example, a locked node may be displayed as a node having an additional border, a different color, a "padlock" symbol, or other appropriate visual indicators.

Figure 3A:
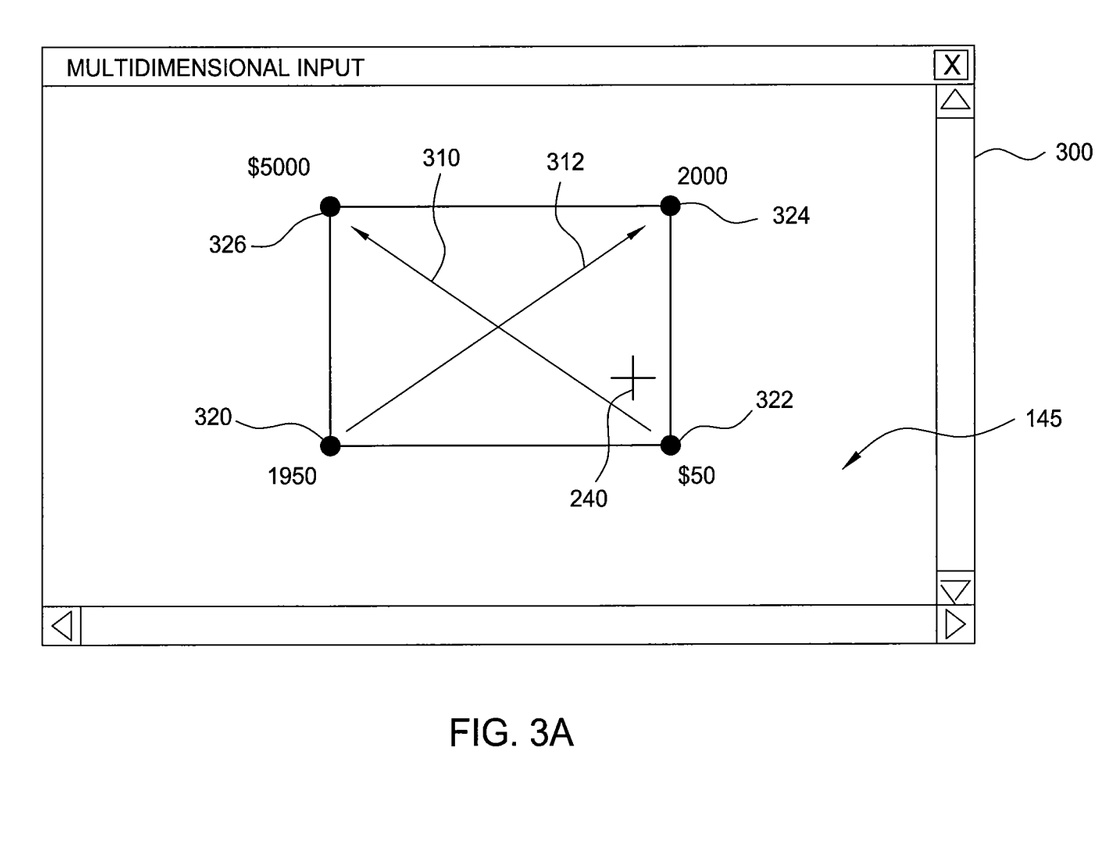
FIGS. 3A-3B illustrate aspects of a graphical user interface providing a multidimensional input interface, according to one embodiment of the invention.

In another embodiment, a parameter (i.e., dimension) included in a multidimensional input interface may be defined by a pair of nodes. FIG. 3A illustrates a screen display 300 of GUI 145 including dimensions defined by pairs of nodes, according to one embodiment of the invention. In this example, assume GUI 145 is configured to receive user input for searching a database listing items of furniture offered for sale of furniture. As shown, GUI 145 includes a "1950" node 320 and a "2000" node 324, respectively representing the earliest and latest years of manufacture of the furniture offered for sale. In this embodiment, the combination of nodes 320 and 324 may be used to define a continuous time dimension, corresponding to the age of the furniture. That is, a user input within GUI 145 may be used to indicate a preferred value for a time parameter, rather than a relative importance of one parameter over another. This aspect is illustrated by the dotted arrow 312, representing the time dimension defined by nodes 320 and 324. Similarly, GUI 145 includes a "$50" node 322 and a "$5000" node 326, respectively representing the lowest and highest dollar values for the furniture offered for sale. Thus, a user input within GUI 145 may be evaluated in terms of its position along the value dimension, which is illustrated by a dotted arrow 310 defined by nodes 322 and 326.

In yet another embodiment, a set of nodes included in GUI 145 may represent dependent parameters, meaning parameters that are affected by changes to other parameters. Such dependent parameters may represent aspects of a shared resource of an application. For example, video settings of a computer (e.g., resolution, color depth, etc.) may be configured according to a user's preferences. Typically, increasing the quality of a video setting requires greater consumption of shared system resources (e.g., memory, CPU cycles, cache, etc). However, the shared system resources are finite, and must be allocated to the various processes that consume those resources. Thus, a user requiring a high-quality video display (e.g., a video game enthusiast) may have to balance multiple video settings so as to achieve a preferred allocation of the shared system resources. Such video settings can be considered to be dependent parameters, since increasing the quality of one setting may have to be offset by decreasing the quality of another setting.

Figure 3B:
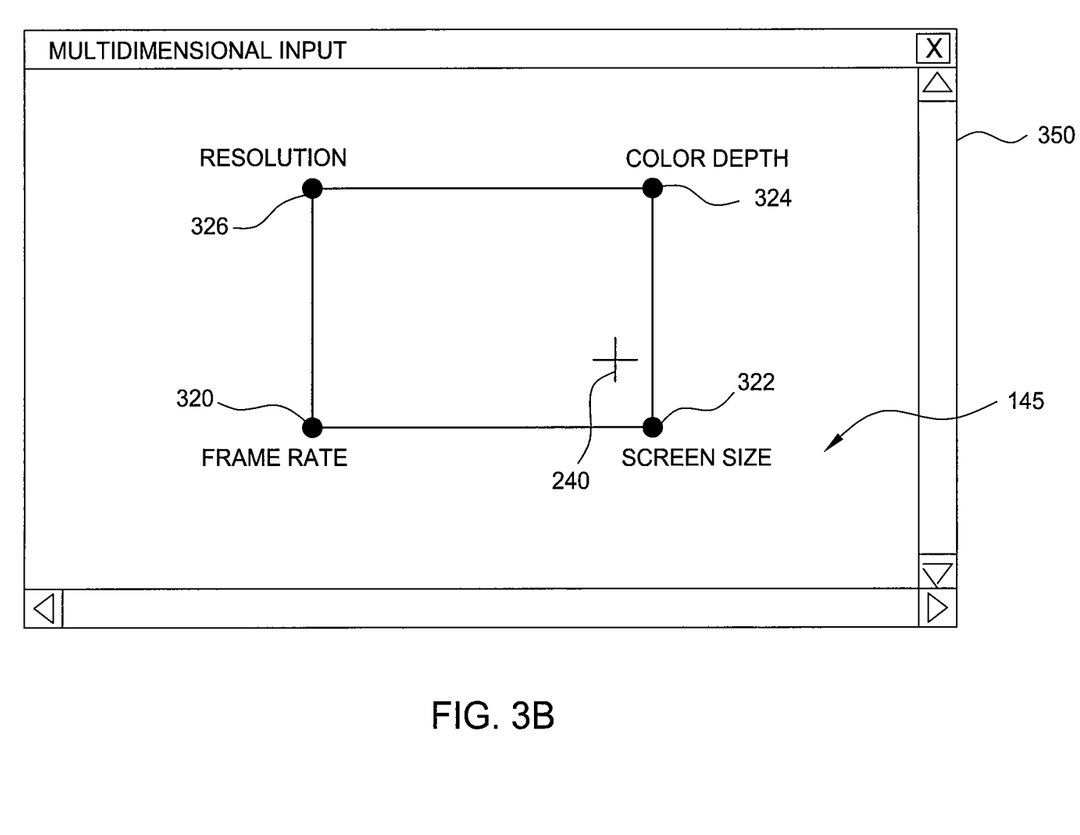

FIG. 3B illustrates a screen display 350 of GUI 145 having nodes defining dependent parameters, according to one embodiment of the invention. In this example, GUI 145 allows users to input video settings for a graphics device on computer system. As shown, GUI 145 includes a "FRAME RATE" node 330, a "SCREEN SIZE" node 332, a "COLOR DEPTH" node 334, and a "RESOLUTION" node 336, each representing a configurable video setting of a computer. As described above, such video settings can be considered as dependent parameters, meaning they share common system resources. Further, as the user may not have the necessary expertise to configure the graphics device, the multidimensional input interface allows the user to intuitively specify what characteristics are important to that user, without having to balance each of the settings against one another.

In this example, a single input within GUI 145 may be evaluated in terms of the relative position of the input location to each of four nodes 330, 332, 334, and 336. That is, the input may be described by coordinates in four dimensions, with each dimension defined by proximity to a different node. Thus, each coordinate may be determined by measuring a distance to a corresponding node. Once determined, the coordinates may be translated by input translator 146 to the relative weights of the dependent parameters. In one embodiment, a larger coordinate in a given dimension (i.e., the distance to the node) is translated to a smaller relative weight for the corresponding dependent parameter. The input translator 146 may then translate the relative weights of the dependent parameters to actual video settings (e.g., 60 frames per second, 32 bit color depth, etc.) based on the shared resources available. In other words, input translator 146 may be configured to convert a single input in GUI 145 into relative weights of dependent parameters, and to then calculate parameter values that allocate shared system resources.

Of course, FIGS. 2A-2B and FIGS. 3A-3B are included for illustrative purposes only, and is not limiting of the invention. Other embodiments are broadly contemplated. In one example, GUI 145 may include alternative graphical representations, such as the use of lines rather than nodes, etc. In another example, nodes included in GUI 145 may not be arranged in polygons, but may instead be arranged in open shapes (e.g., a "L" shape, a cross shape, etc.), or in curves (e.g., a circle, oval, etc.)

Figure 4:
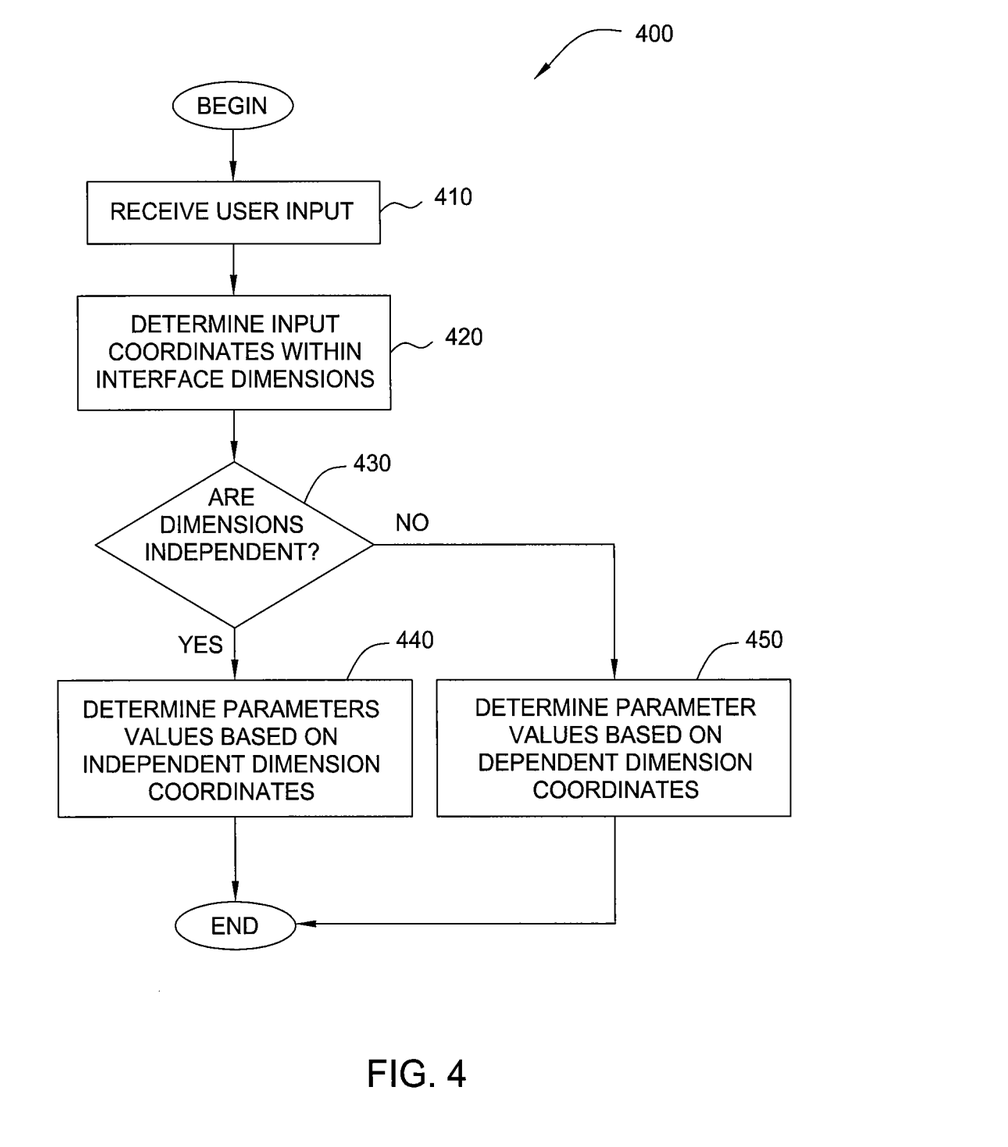
FIG. 4 illustrates a method for using a multidimensional input interface, according to one embodiment of the invention.

FIG. 4 illustrates a method 400 for using a multidimensional input interface, according to one embodiment of the invention. Persons skilled in the art will understand that, even though the method is described in conjunction with the systems of FIGS. 1-3, any system configured to perform the steps of method 400, in any order, is within the scope of the present invention.

As shown, method 400 begins at step 410, where a user input within a multidimensional input interface is received. The user input may result from a user interacting with, for example, GUI 145 illustrated in FIG. 2A. At step 420, the coordinates of the user input within the dimensions of the input interface are determined. In one embodiment, each dimensional node of the input interface represents a data parameter to be determined from input to the multidimensional input. For example, nodes 220 and 222 shown in FIG. 2A serve to define dimensions which correspond to relative values of "TELEPHOTO" and "VACATION" parameters. Thus, for a given user input, step 420 would determine the coordinates along line 230.

At step 430, it is determined whether the dimensions of the multidimensional input interface are independent, meaning that the dimensions represent independent parameters of the application. Typically, a parameter is independent if it is unaffected by a change in another parameter. If the dimensions are independent, then at step 440, parameter values are determined based on the independent dimensions. That is, the coordinates for each dimension are converted into parameter values. Step 440 may be performed, for example, by input translator 146 shown in FIG. 1. After step 440, the method 400 ends. Alternatively, if the dimensions determined to be dependent at step 430, then at step 450, parameter values are determined based on the dependent dimensions. That is, the coordinates within each dimension are converted into relative weights of the dependent parameters, which are used to calculate parameter values constrained against one another. After step 450, the method 400 terminates.

Advantageously, embodiments of the invention may be used to provide an interface for the input of multiple data parameters for a software application. In one embodiment, a user input made within the input interface may result in multiple data parameters being received by the application. The input interface may be defined with a plurality of dimensional nodes, where each dimensional node represents a different data parameters required by the software application. Further, two (or more) dimensional nodes may be related to one another, such that a data parameter specified for one node constrains a data parameter for another dimensional node. However, dimensional nodes may also be generally unrelated to one another.

While the forgoing is directed to embodiments of the present invention, other and further embodiments of the invention may be devised without departing from the basic scope thereof, and the scope thereof is determined by the claims that follow.

What is claimed is:

1. A method for providing multidimensional data input to a computer program, comprising:
    receiving a user-selected location within a graphical interface, wherein the graphical interface includes at least two nodes, and each node corresponds to an input parameter to be provided to the computer program;
    determining a coordinate location of the user-selected location within the graphical interface relative to the at least two nodes; and
    based on the coordinate location of the user-selected location within the graphical interface, determining a value for each of the input parameters,
    wherein one or more of the nodes of the graphical interface are selectively lockable by a user, wherein a locked node indicates a fixed value for an input parameter corresponding to the locked node.

2. The method of claim 1, wherein a value for one of the input parameters is determined based on both (i) a distance between a first node, of the at least two nodes, and the user-selected location and (ii) a distance between a second node, of the at least two nodes, and the user-selected location.

3. The method of claim 1, wherein a value for one of the input parameters is determined based on a position of the user-selected location between two nodes.

4. The method of claim 1, wherein a value for a first input parameter, of the one or more input parameters, and a value for a second input parameter, of the one or more input parameters, are dependent on one another, and wherein the value for the first and second parameters are determined based on a position of the user-selected location relative to two of the nodes.

5. The method of claim 1, wherein the input parameters specify relative weights assigned to search criteria.

6. The method of claim 1, wherein a user may selectively modify, add, or remove a node from the graphical interface.

7. A computer-readable storage medium storing instructions for providing multidimensional data input to a computer program, including instructions for performing the steps of:
    receiving a user-selected location within a graphical interface, wherein the graphical interface includes at least two nodes, and each node corresponds to an input parameter to be provided to the computer program;
    determining a coordinate location of the user-selected location within the graphical interface relative to the at least two nodes; and
    based on the coordinate location of the user-selected location within the graphical interface, determining a value for each of the input parameters,
    wherein one or more of the nodes of the graphical interface are selectively lockable by a user, wherein a locked node indicates a fixed value for an input parameter corresponding to the locked node.

8. The computer-readable storage medium of claim 7, wherein a value for one of the input parameters is determined based on both (i) a distance between a first node, of the at least two nodes, and the user-selected location of the user selection and (ii) a distance between a second node, of the at least two nodes, and the user-selected location.

9. The computer-readable storage medium of claim 7, wherein a value for one of the input parameters is determined based on a position of the user-selected location between two nodes.

10. The computer-readable storage medium of claim 7, wherein a value for a first input parameter, of the one or more input parameters, and a value for a second input parameter, of the one or more input parameters, are dependent on one another, and wherein the value for the first and second parameters are determined based on a position of the user-selected location relative to two of the dimensional nodes.

11. The computer-readable storage medium of claim 7, wherein the input parameters specify relative weights assigned to search criteria.

12. The computer-readable storage medium of claim 7, wherein a user may selectively modify, add, or remove a node from the graphical interface.

13. A system, comprising:
    a processor; and
    a memory containing a program, which when executed by the processor is configured to provide a graphical interface for providing multidimensional data input to a computer program, wherein the program is configured to:
    receive a user-selected location within a graphical interface, wherein the graphical interface includes at least two nodes, and each node corresponds to an input parameter to be provided to the computer program;
    determine a coordinate location of the user-selected location within the graphical interface relative to the at least two nodes; and
    based on the coordinate location of the user-selected location within the graphical interface, determine a value for each of the input parameters,
    wherein one or more of the nodes of the graphical interface are selectively lockable by a user, wherein a locked node indicates a fixed value for an input parameter corresponding to the locked node.

14. The system of claim 13, wherein a value for one of the input parameters is determined based on both (i) a distance between a first node, of the at least two nodes, and the user-selected location and (ii) a distance between a second node, of the at least two nodes, and the user-selected location.

15. The system of claim 13, wherein a value for one of the input parameters is determined based on a position of the user-selected location between two nodes.

16. The system of claim 13, wherein a value for a first input parameter, of the one or more input parameters, and a value for a second input parameter, of the one or more input parameters, are dependent on one another, and wherein the value for the first and second parameters are determined based on a position of the user-selected location relative to two of the nodes.

17. The system of claim 13, wherein the input parameters specify relative weights assigned to search criteria.

18. The system of claim 13, wherein a user may selectively modify, add, or remove a node from the graphical interface.

\* \* \* \* \*